United States Patent [19]

Iversen

[11] Patent Number: 5,594,972
[45] Date of Patent: Jan. 21, 1997

[54] DUST COLLECTOR

[76] Inventor: Edward P. Iversen, 14 Woodview La., Algonquin, Ill. 60102

[21] Appl. No.: 515,511

[22] Filed: Aug. 15, 1995

[51] Int. Cl.$^6$ .............................. B24B 55/06; A47L 5/38
[52] U.S. Cl. ................................ 15/301; 15/339; 83/100; 451/456; 454/63
[58] Field of Search ............................ 15/301, 339, 310; 451/456; 83/100, 168, 169; 144/252 R; 454/63

[56] References Cited

U.S. PATENT DOCUMENTS

| | | |
|---|---|---|
| 2,384,688 | 9/1945 | Litman . |
| 2,855,837 | 10/1958 | Bakke ........................................ 454/63 |
| 3,008,357 | 11/1961 | Burns . |
| 3,096,933 | 7/1963 | Bora ..................................... 454/63 X |
| 3,321,871 | 5/1967 | Balamuth et al. .................. 451/456 X |
| 3,322,169 | 5/1967 | Hilliard . |
| 3,401,724 | 9/1968 | Kreitz . |
| 3,460,294 | 8/1969 | Stumpf . |
| 3,525,183 | 8/1970 | Gargrave . |
| 3,745,991 | 7/1973 | Gauthier ............................... 454/63 X |
| 3,945,281 | 3/1976 | Kreitz . |
| 4,109,144 | 8/1978 | Vidmar .................................. 454/63 X |
| 4,192,194 | 3/1980 | Patenaude ............................. 451/456 |
| 4,596,060 | 6/1986 | Schmidt et al. ...................... 15/301 X |
| 5,491,870 | 2/1996 | Holmes ..................................... 15/301 |

Primary Examiner—Chris K. Moore
Attorney, Agent, or Firm—Mathew R. P. Perrone, Jr.

[57] ABSTRACT

A dust collector, with a funnel assembly mounted on a flexible arm and provided with a vacuum assist, provides a sutiable apparatus to remove residue caused by a machining practice applied to a work piece.

20 Claims, 6 Drawing Sheets

DUST COLLECTOR

This invention relates to a dust collector and more particularly to a dust collector for use with a grinding machine in a machine shop.

BACKGROUND OF THE INVENTION

Precision parts are required in many instances. A standard effort to produce these precision parts is by grinding and otherwise treating a surface. This is typically done in specialty areas, such as a small machine tool shop. During the course of this practice, an amount of dust and grindings, and even sparks can be created. When these dust sparks and grindings are created, it is desirable to control the dusts and grindings and keep them away from the machine tool operator.

A grinding machine is customarily placed adjacent to wall of a shop. The horizontal axis of the grinding machine is usually at an acute angle with the wall. The machine operator usually stands within the obtuse angle formed by the grinding machine and the wall.

As in most situations requiring precision work, it is desirable in this field to work in clean environment. A clean environment adds to the quality of a product and the efficiency of the work place. With the increased awareness of pollution concerns, the clean environment becomes even more important.

It is well settled that residue; such as dust, sparks or grindings in the atmosphere; can have an adverse effect on health. Any device, which can minimize, these problems provides many advantages. However, such a device must not unreasonably interfere with the work in progress. The avoidance of residue and the interference with work seem to be odds with each other. Maximization of one minimizes the other, when it is desirable to maximize the advantages of both.

Typical dust covers do not accomplish this goal of dual maximization. Typical dust covers do permit the dust and grindings to, at best dirty the shop area and at worst, provide an environmental hazard from the dust and grindings being put into the air. It is very difficult to control these dusts and grindings and provide a dust cover, which causes the dust to flow away from that operation.

Such a dust cover must keep the dust and grinding residues away from the operator, must permit the operator to see the area of work and must not otherwise interfere with the function of the grinding machine or other shaping machine.

SUMMARY OF THE INVENTION

Among the many objectives of this invention is the provision of a dust collector to remove dust and grindings to safe area with minimal interference with the work.

Another objective of this invention is to provide a movable dust collector.

Yet another objective of this invention is to provide a dust collector to simplify cleaning of a work area.

Still another objective of this invention is to provide a dust collector to reduce pollution at a work area.

Additionally, an objective of this invention is to a dust collector to provide a good view of the work area.

Also, an objective of this invention is to provide a dust collector with minimized interference with the work piece.

A still further objective of this invention is to provide a dust collector to control sparks in a work area.

Yet a further objective of this invention is to provide a dust collector having a flexible position.

These and other objectives of the invention (which other objectives become clear by consideration of the specification, claims and drawings as a whole) are met by providing a dust collector, with a funnel assembly mounted on a flexible arm and provided with a vacuum assist, in order to remove residue caused by a machining practice applied to a work piece.

BRIEF DESCRIPTION OF DRAWINGS

Throughout the figures of the drawings where the same part appears in more than one figure the same number is applied thereto.

DESCRIPTION OF PREFERRED EMBODIMENTS

A dust collector uses a funnel assembly mounted on an adjustable arm to permit the dust collector to be positioned in relation to the work piece or material being ground, in combination with a vacuum hose to cause safe and efficient removal of residue from a work area. The grinding device includes a grinding wheel and other standard machine tool devices for moving the material under the grinding wheel to be finished or otherwise shaped.

The adjustable dust collector includes a funnel assembly, also known as a dust cone assembly. The wide mouth for the funnel of the dust collector receives the dust from the grinding wheel and directs it to the narrow base of the funnel. The narrow base is connected to a vacuum to assist with the residue collection. All residue from the grinding of the material enter the funnel.

Included in the residue are dust, larger particles such as grindings, and sparks. Any one of these items, at best, dirties the work area and can interfere with the production of a good product. At worst, the residue can create a severe environmental hazard and extreme danger to the operator. This dust collector can substantially minimize all of those problems.

There is an adjustable arm mount used in combination with the funnel assembly or dust cone assembly, which assists in positioning the dust collector appropriately. The base of the funnel is connected to a vacuum hose. In this picture, the grinding device has a grinding wheel. A work piece or piece of material is supported on a travel table, which moves the material under the grinding wheel. This is a standard setup for a grinding tool. The hose and the funnel along with the adjustable arm mount provide tremendous adjustability for the dust collector.

The dust collector has an plastic funnel housing with a steel cone therein. A channel edge surrounds the outer side of plastic funnel and directs dust into the funnel. In the center of the steel cone, is a slidably mounted torpedo, which serves as a guide to help collect the sparks and dust. The torpedo adjusts the flow of dust into the vacuum hose and can assist in directing or guiding the hot spark and dust trail to a point for collecting the same.

This particular vacuum structure with the torpedo permits the hot spark and dust trail to be concentrated at the center and leaves fine dust and other dust to go outside and be collected by the other avenues of the funnel. The steel cone and the plastic funnel combine to provide for a flow of the dust into the channel. The steel cone is mounted around the torpedo but provides space between the torpedo and permits the dust flow to be achieved. The steel cone is secured in the plastic funnel with fastener screws or another suitable fastening device.

Within the base of the plastic funnel is an exhaust channel, which permits dust to flow thereout and into the vacuum hose. The vacuum hose is secured to the funnel by a hose end of the base sleeve. Base sleeve has a funnel end which attaches to the base of plastic funnel. In this fashion, the assemblage of the dust collector to the funnel is permitted.

The adjustable arm of the dust collector permits adjustment thereof as desired, due to the following structure. Mounted on the wall adjacent to the machine is a hinge clamp with a base tube clamp. The base bracket mounts to the wall. Rotatably mounted thereon is the hinge clamp with the base tube clamp and the base bracket.

The base tube runs from the base tube clamp to an elbow bracket which is connected to an elbow clamp. The elbow clamp has an elbow tube connected to the funnel clamp, which in turn holds the funnel in position. The elbow tube runs from the elbow clamp and reaches to the ball joint clamp, which is attached to the funnel clamp. The vacuum hose is then attached to the hose clamp. With this particular structure of the tube to elbow clamp and adjustments therein, the dust collector can be put in any suitable position around the grinding device as desired.

Figure 1:
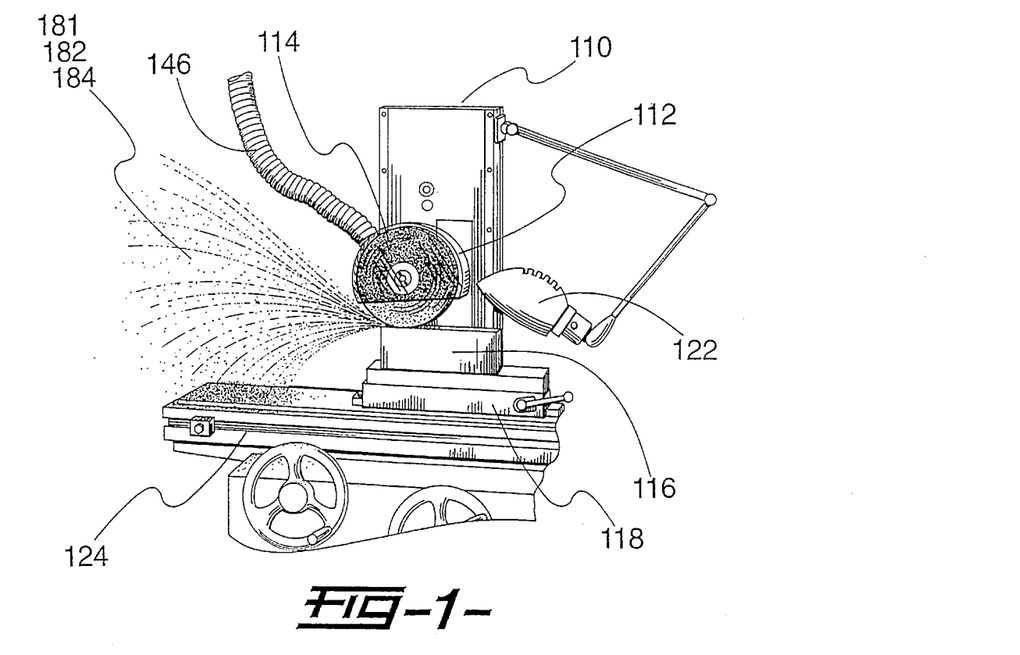
FIG. 1 depicts a standard grinding device 110 with a standard dust guard 112 in position thereon.

Referring now to FIG. 1, the grinding device 110 is depicted with a prior art, standard dust guard 112 in place. The grinding device 110 includes a power grinding wheel 114 and other standard machine tool devices for moving the material 116 under the grinding wheel 114 for a finishing and supporting the material thereon. A magnet base 118 assists in supporting the stock or material 116 on grinding base 120. Lamp 122 is standardly connected to illuminate the work area as desired. Grinding base 120 is in turn supported on a travel table 124, as is typical of a grinding device 110.

Figure 2:
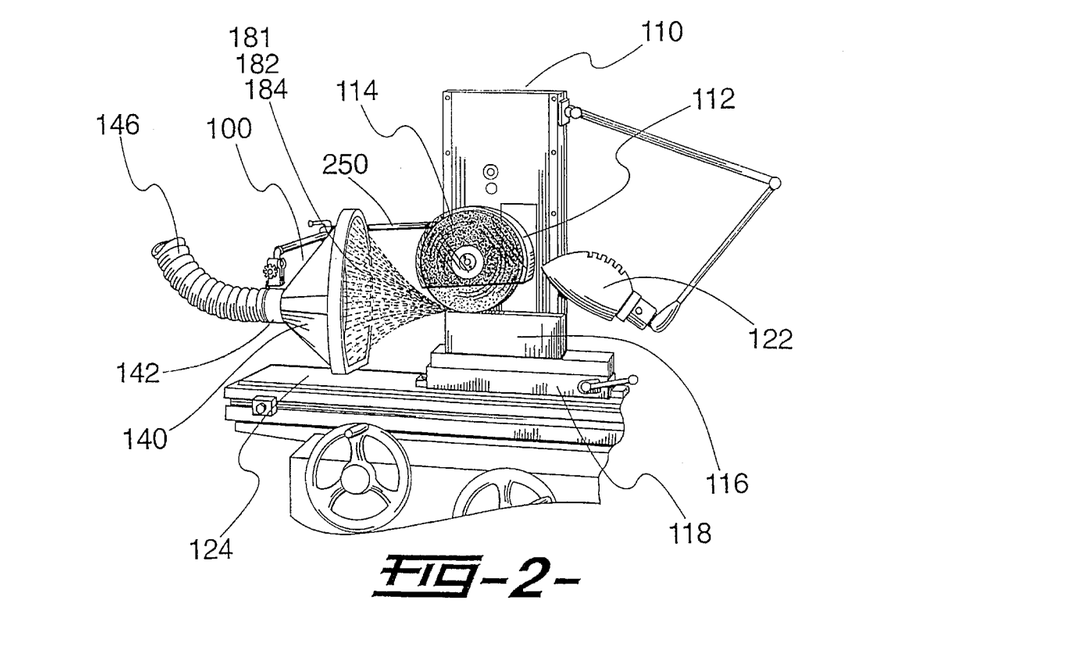
FIG. 2 depicts a standard grinding device 110 with the dust collector 100 of this invention in place.
Figure 3:
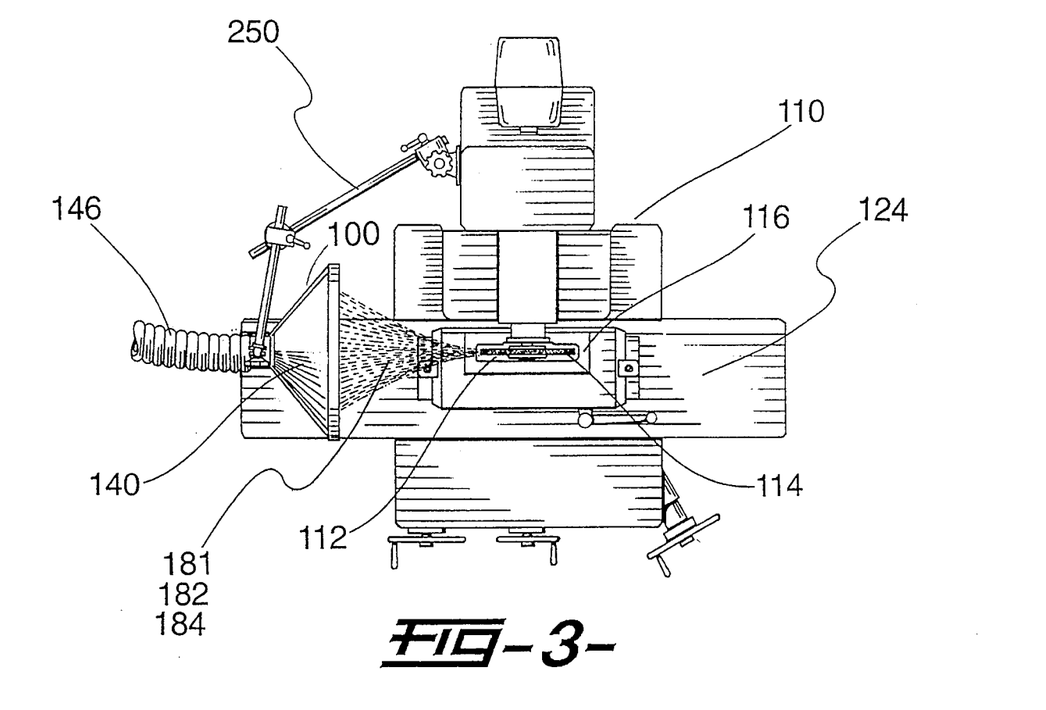
FIG. 3 depicts a top view of dust collector 100.

Referring now to FIG. 2 and FIG. 3, the grinding device 110 is shown with the dust collector 100 in position. The funnel assembly 140 of the dust collector 100 receives the dust from the grinding wheel 114 as assisted thereby with a vacuum. Dust, sparks and grindings enter the funnel assembly 140, and pass therethrough into a vacuum hose 146. Vacuum hose 146 transports the flow of residue to a desirable disposal point (not shown).

The disposal point can include any suitable container or other device to receive the residue from the grinding operation. Such residue may then recycled, if possible, or properly disposed of, if required.

There is an adjustable mount system 250 which assists in positioning the funnel assembly 140 appropriately. The base 142 of the funnel assembly 140 of course is connected to the vacuum hose 146. The grinding device 110 can be seen as having a grinding wheel 114. The work piece or material 116 is supported on travel table 124 which drives the material 116 under the grinding wheel 114. This is a standard setup for a grinding tool, such as grinding device 110.

Figure 4:
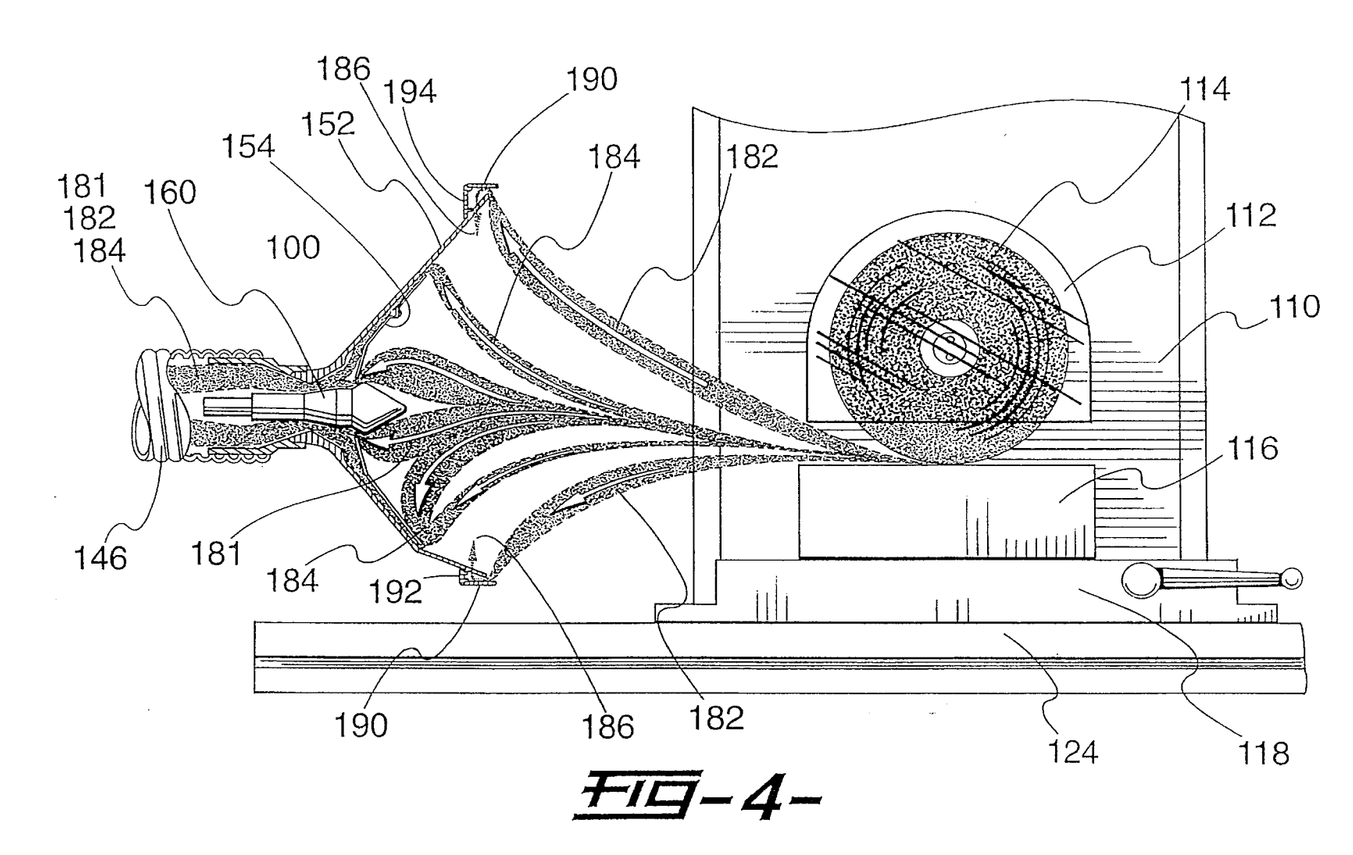
FIG. 4 depicts a side cross-sectional view of dust collector 100 combined with a designed dust trail 130.
Figure 5:
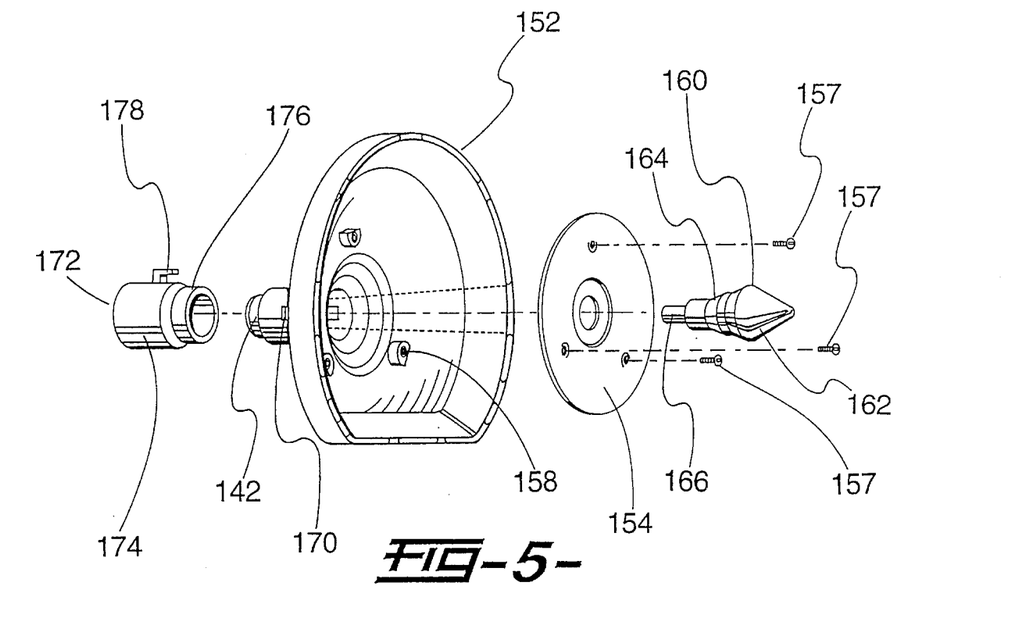
FIG. 5 depicts a front exploded view of the frontal assembly 150 for the dust collector 100.

Adding FIG. 4 and FIG. 5 to the consideration, the cooperation of the vacuum hose 146 and the funnel assembly 140 along with the adjustable mount system 250 become more clear. The vacuum drawn through hose 146 collects sparks 181, dust 182, and grindings 184 into the funnel assembly 140 and transports the residue to a safe place, for eventual recycling or disposal. Sparks 181 are brief light flashes capable of starting a fire created by the grinding process. Dust 182 includes fine particles separated from material 116 by the grinding process. Grindings 184 include larger particles separated from material 116 by the grinding process.

In FIG. 4, a cross-section of the dust collector 100 shows a plastic funnel housing 152 having contained therein a steel cone 154. This FIG. 4 when combined with FIG. 5 cooperates to depict funnel assembly 140.

Channel edge 156 snaps onto the outer side of plastic funnel housing 152 in a standard fashion. Any other removable mount may be used to thus secured channel edge 156. The standard snap mount is preferred. At any rate, the lower u-shaped end cap 192 and upper crescent end cap 194 surrounds the outer side of plastic funnel housing 152 to collect dust or other residue, that can otherwise miss the funnel assembly 140, and directs dust into the funnel assembly 140.

In the center of the steel cone 154, is a slidably mounted torpedo 160. The torpedo 160 adjusts the flow of residue dust into the funnel assembly 140. Then vacuum hose 146 can assist in the hot spark and dust trail collection. This particular structure with the torpedo 160 permits the hot spark and dust trail to be concentrated at the center of funnel assembly 140.

The fine dust and other dust tends to go outside of funnel assembly 140 and be collected by the other avenues of the funnel assembly 140 such as channel edge 156. The steel cone 154 and the plastic funnel housing 152 combine to provide for a flow of the dust into the channel edge 156 and then into the funnel assembly 140.

The steel cone 154 is mounted around the torpedo 160 but provides space between the torpedo 160 and permits the dust flow to be achieved. The steel cone 154 is mounted in the plastic funnel housing 152 by fastener screws 157, which fit into apertures 158 within the funnel assembly 140.

Torpedo 160 has a conical tip 162 protruding through the steel cone 154. The conical tip 162 has a truncated cone 164 protruding from the base of conical tip 162. A torpedo pilot 166 in the form of a cylindrical base extends from truncated cone 164 and is oppositely disposed from conical tip 162.

Figure 6:
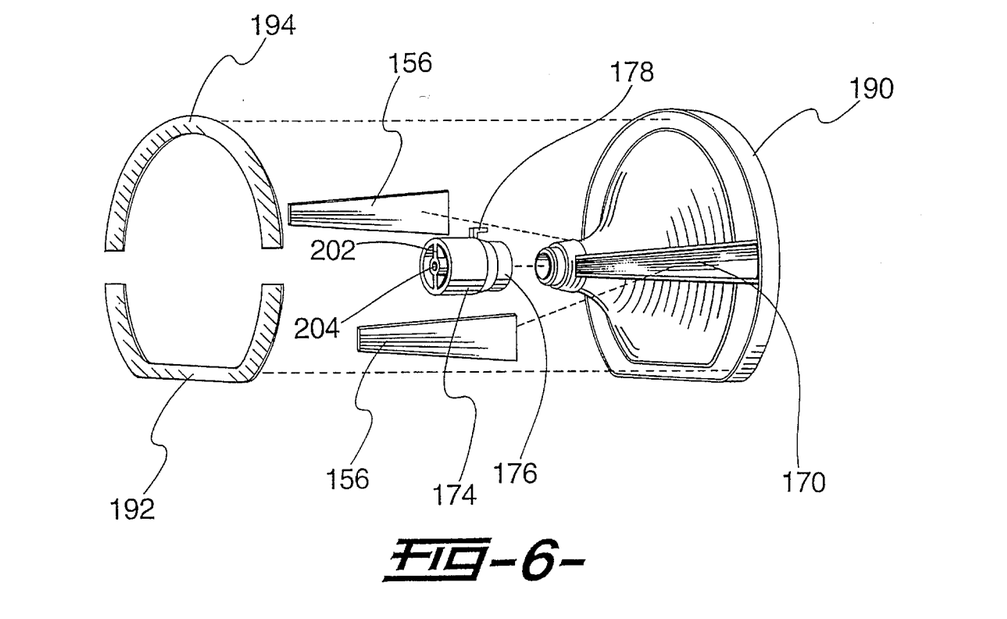
FIG. 6 depicts a reverse view of FIG. 5.

Adding FIG. 5 and FIG. 6 to the consideration, within the base 142 of the plastic funnel housing 152 is an exhaust channel 170 which permits dust to flow thereout and into the vacuum hose 146. The vacuum hose 146 is secured to the hose end 172 of the base sleeve 174. Base sleeve 174 has a funnel end 176 which attaches to the base 142 of plastic funnel housing 152. In this fashion, the assemblage of the dust collector 100 and the vacuum hose 146 is permitted.

Base sleeve 174 is of a generally cylindrical shape, and also includes also includes a hose end 172. Hose end 172 attaches to vacuum hose 146. Funnel end 176 usually has a smaller diameter than hose end 172 in order to slide into base 142 of plastic funnel housing 152. Hose end 172 generally includes a mount coupling finger 185 to permit the attachment of clamp 251 to adjustable mount 250 and base sleeve 174.

Figure 8:
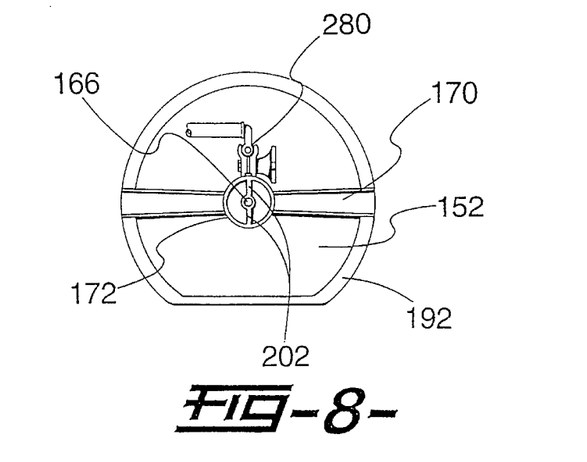
FIG. 8 depicts a rear view of the dust housing 180.

With FIG. 6 and FIG. 8, the structure of plastic housing collar 190 is depicted. Plastic housing collar 190 fits around the outer edge of plastic funnel housing 152, and joins with a lower u-shaped end cap 192 and upper crescent end cap 194. Plastic housing collar 190, lower u-shaped end cap 192 and upper crescent end cap 194 are snap fitted in position on plastic funnel housing 152 by a pair of oppositely disposed side channel end caps 156.

Figure 7:
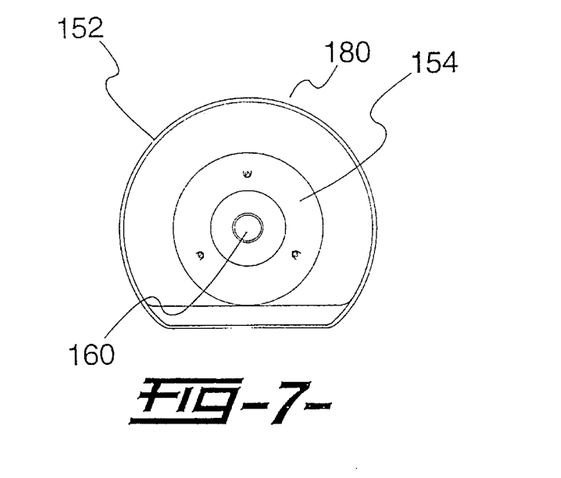
FIG. 7 depicts a front view of the dust housing 180.

The relationship of plastic housing collar 190 and plastic funnel housing 152 is emphasized by FIG. 7 in combination with FIG. 4. Plastic housing collar 190 serves to trap dust 182 and drive it through dust apertures 198 in the rim or wide mouth of plastic funnel housing 152.

Figure 9:
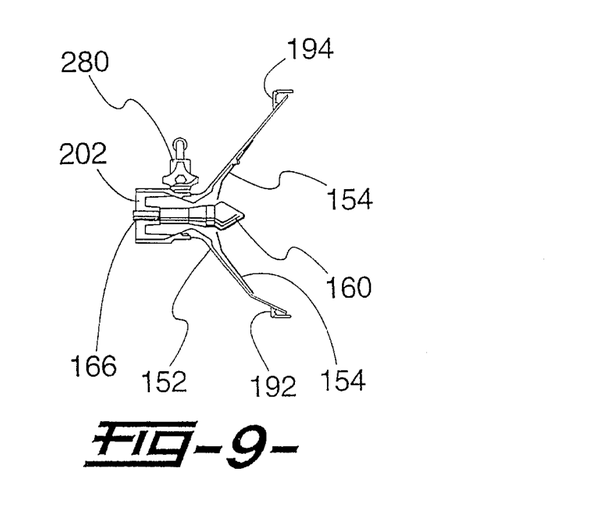
FIG. 9 depicts a side cross-sectional view of the dust housing 180.

In FIG. 9, torpedo 160 is depicted as mounted in hose end 172. Hose end 172 includes a vertical strut support 202, with a central ring 204 therein to receive torpedo pilot 166 and thence mount torpedo 160 in funnel assembly 140.

Base sleeve 174 is of a generally cylindrical shape, and also includes also includes the hose end 172. Hose end 172 attaches to vacuum hose 146. Funnel end 176 usually has a smaller diameter than hose end 172 in order to slide into funnel end 176.

Figure 10:
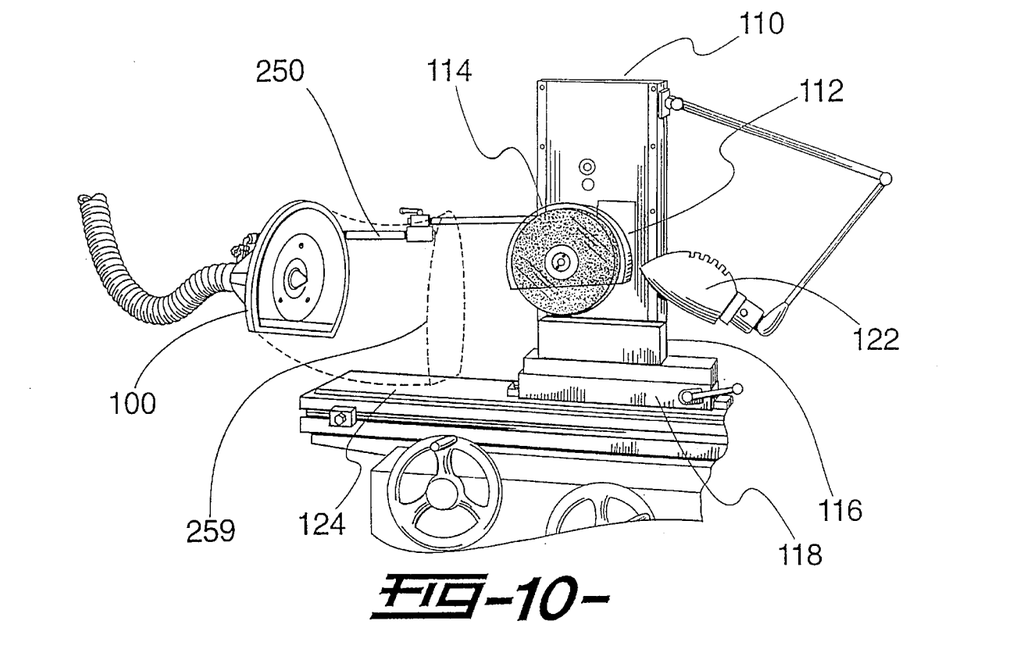
FIG. 10 depicts a side perspective view indicating the mobility of dust collector 100.
Figure 11:
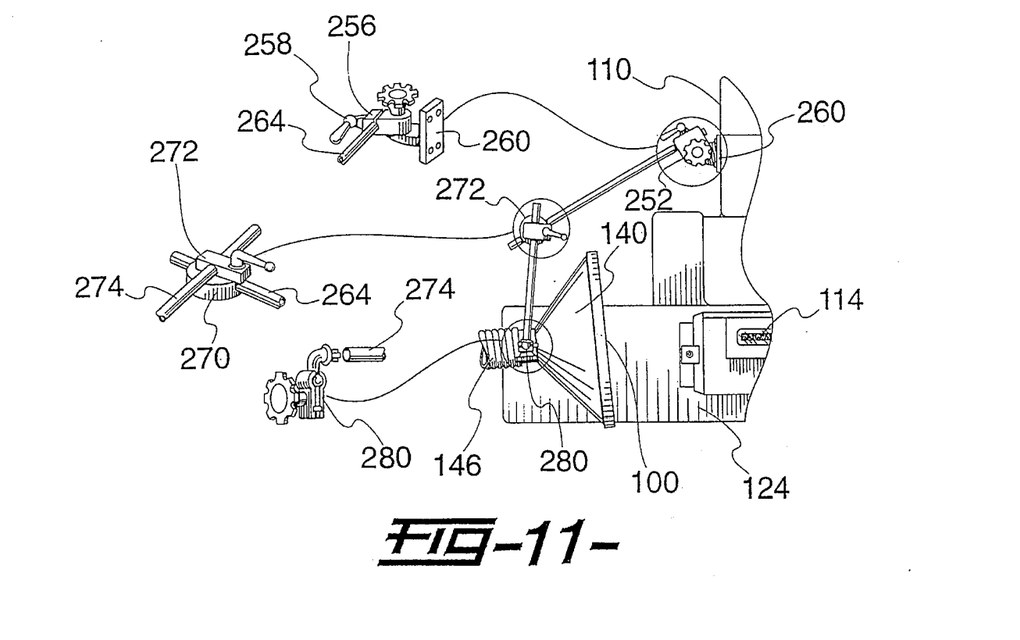
FIG. 11 depicts a top over view of the adjustable mount system 250 of the dust collector 100.

Referring now to FIG. 10 and FIG. 11, the adjustable mount system 250 of the dust collector 100 is shown. A machine end 252 is mounted on grinding device 110. Alternatively, a wall (not shown) adjacent to the grinding device 110 may receive machine end 252. Funnel end 254 of the adjustable mount system 250 is oppositely disposed from machine end 252. Funnel end 254 has funnel assembly 140 secured thereto.

Located at machine end 252 is a hinge clamp 256 with a base tube clamp 258 mounted thereon. A base bracket 260 for hinge clamp 256 mounts to the grinding device 110 and secures hinge clamp 256 in a desirable position. Thus, rotatably mounted on the base bracket 260 is the hinge clamp 256.

The base tube clamp 262 cooperates with the hinge clamp 256 and the base bracket 260. The base tube 264 is received between the hinge clamp 256 and base tube clamp 262. Base tube 264 extends from base tube clamp 262 to an elbow bracket 270 which is connected to an elbow clamp 272.

The elbow clamp 272 has a funnel tube 274 connecting the elbow clamp 272 to a ball joint clamp 280. The ball joint clamp 280 holds the funnel assembly 140 in a desired position. The funnel tube 274 reaches to elbow clamp 272 from the ball joint clamp 280.

The ball joint clamp 280, which is fixed to the dust cone assembly 140 at funnel end 176 of base sleeve 174, is accomplished by gripping the base sleeve coupling mount finger 78. The ball joint clamp 280 thus provides flexibility in the attachment of the funnel assembly 140, and simplifies the structure with its dual purpose. The vacuum hose 146 is then attached to the hose clamp 276. With this particular structure of the funnel tube 274 to elbow clamp 272 and adjustments therein, the dust collector 100 can be put in any suitable position.

With this structure, it thus becomes possible to move funnel assembly 140 into operating position 259 adjacent to the grinding wheel 114. The adjustable mount system 250 makes this clearly possible by permitting the movement of the funnel assembly 140 into operating position 259, to collect the sparks 181, dust 182 or grindings 184.

While various parts of funnel assembly 140 are described as being made of aluminum, steel or plastic; it is clear that other materials may be used. The criticality is that the various parts have the desired durability and structure required to survive for a substantial period of time in the somewhat harsh environment of a machine shop.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the United States is:

1. A dust collector for controlling a flow of residue from a machining process including a funnel assembly mounted on a flexible arm, the dust collector further comprising:
   a) a vacuum assisting means directing the flow of residue into the funnel assembly;
   b) the funnel assembly including a wide mouth and a narrow base;
   c) the vacuum assisting means being connected to the narrow base;
   d) the flexible arm positioning the dust collector to receive the flow of residue;
   e) the wide mouth being formed by a funnel housing;
   f) a channel means on the wide mouth forming a channel around the funnel assembly;
   g) a slidably mounted guide means being mounted within the funnel assembly;
   h) the slidably mounted guide means directing the flow of residue within the funnel assembly; and
   i) the narrow base further including an exhaust channel for the flow of residue, thereby permitting the flow of residue therethrough to the vacuum assisting means.

2. The dust collector of claim 1 further comprising:
   a) the vacuum assisting means including a hose and a suction device;
   b) the hose having a first hose end and a second hose end oppositely disposed from the first hose end;
   c) the first hose end being secured to the suction device; and
   d) the second hose end being secured to the narrow base.

3. The dust collector of claim 2 further comprising:
   a) the flexible arm being secured at a first arm end thereof;
   b) the flexible arm being secured at a second arm end thereof to the funnel assembly;
   c) the first arm end having a substantially fixed position when secured; and
   d) the second arm end being movable in order to position the funnel assembly.

4. The dust collector of claim 3 further comprising:
   a) the hose having a sleeve connector to attach the second hose end to the narrow base;

b) the flexible arm having a movable assembly between the first arm end and the second arm end;

c) the movable assembly including a hinge clamp with a base tube clamp adjacent to the first arm end;

d) the first arm end being mounted on a base bracket; and e) the hinge clamp being mounted on the base bracket.

5. The dust collector of claim 4 further comprising:

a) a base tube being connected to the base tube clamp;

b) an elbow bracket being mounted on the base tube and oppositely disposed from the base tube clamp;

c) an elbow tube being additionally mounted on the elbow bracket; and d) the elbow tube having a funnel clamp secured thereto and oppositely disposed from the elbow bracket.

6. The dust collector of claim 5 further comprising:

a) the funnel clamp including a ball joint clamp and a secondary clamp;

b) the ball joint clamp being attached to the elbow tube; and c) the secondary clamp being attached to the ball joint clamp and the funnel assembly.

7. The dust collector of claim 6 further comprising:

a) the vacuum hose being attached to a hose clamp;

b) the hose clamp securing the vacuum hose to the funnel assembly; and c) the vacuum hose directing the flow of residue to a suitable disposal location.

8. The dust collector of claim 7 further comprising:

a) the vacuum hose collecting sparks, dust, or grindings from the funnel assembly;

b) a channel edge being removably secured to an outer side of the funnel assembly;

c) said guide means consisting of a slidably mounted torpedo being centrally mounted in the narrow base; and d) the torpedo permitting the flow of residue to the vacuum hose to be adjusted.

9. The dust collector of claim 8 further comprising:

a) the funnel assembly including a cone and a funnel housing to support the torpedo;

b) the cone being mounted within the funnel housing; and c) the cone being spaced apart from the funnel housing to permit the flow of residue.

10. The dust collector of claim 9 further comprising:

a) the torpedo having a conical tip protruding through the cone;

b) the conical tip having a truncated cone protruding from a base of the conical tip; and c) a torpedo pilot in the form of a cylindrical base extending from the truncated cone and being oppositely disposed from the conical tip.

11. The dust collector of claim 10 further comprising:

a) the funnel assembly having a base sleeve;

b) the base sleeve having a generally cylindrical shape;

c) the base sleeve having a hose end attached to the vacuum hose; and d) the base sleeve having a funnel end oppositely disposed the hose end attached to the narrow base.

12. The dust collector of claim 11 further comprising:

a) the funnel assembly having a smaller diameter than hose end in order to slide into the narrow base; and b) the hose end including a mount coupling finger to permit snap attachment of the base sleeve to the narrow base.

13. The dust collector of claim 12 further comprising:

a) the funnel assembly having a housing collar at the wide mouth;

b) the housing collar including a lower u-shaped end cap and upper crescent end cap; and c) the housing collar being snap fitted to the wide mouth.

14. The dust collector of claim 13 further comprising:

a) the housing collar including a pair of oppositely disposed side channel end caps;

b) the housing collar serving to trap the flow of residue;

c) the funnel housing including dust apertures at the wide mouth;

d) the hose end including a vertical strut support for the torpedo; and e) the vertical strut support including a central ring therein to receive the torpedo pilot and thereby mount the torpedo in the funnel assembly.

15. A dust collector for controlling a flow of residue from a machining process including a funnel assembly mounted on a flexible arm, the dust collector further comprising:

a) a vacuum assisting means directing the flow of residue into the funnel assembly;

b) the funnel assembly including a wide mouth and a narrow base;

c) the vacuum assisting means being connected to the narrow base;

d) the flexible arm positioning the dust collector to receive the flow of residue;

e) the wide mouth being formed by a funnel housing;

f) the vacuum assisting means including a hose and a suction device;

g) the hose having a first hose end and a second hose end oppositely disposed from the first hose end;

h) the first hose end being secured to the suction device;

i) the second hose end being secured to the narrow base; and j) the funnel assembly including a steel cone mounted therein.

16. The dust collector of claim 15 further comprising:

a) a channel means on the wide mouth forming a channel around the funnel housing;

b) a slidably mounted guide means being mounted within the steel cone;

c) the slidably mounted guide means directing the flow of residue within the steel cone;

d) the narrow base further including an exhaust channel for the flow of residue, thereby permitting the flow of residue therethrough to the vacuum assisting means;

e) the flexible arm being secured at a first arm end thereof;

f) the flexible arm being secured at a second arm end thereof to the funnel assembly;

g) the first arm end having a substantially fixed position when secured;

h) the second arm end being movable in order to position the funnel assembly;

i) the hose having a sleeve connector to attach the second hose end to the narrow base;

j) the flexible arm having a movable assembly between the first arm end and the second arm end;

k) the movable assembly including a hinge clamp with a base tube clamp adjacent to the first arm end;

l) the first arm end being mounted on a base bracket; and m) the hinge clamp being mounted on the base bracket.

17. The dust collector of claim 16 further comprising:

a) a base tube being connected to the base tube clamp;

b) an elbow bracket being mounted on the base tube and oppositely disposed from the base tube clamp;

c) an elbow tube being additionally mounted on the elbow bracket;

d) the elbow tube having a funnel clamp secured thereto and oppositely disposed from the elbow bracket;

e) the funnel clamp including a ball joint clamp and a secondary clamp;

f) the ball joint clamp being attached to the elbow tube;

g) the secondary clamp being attached to the ball joint clamp and the funnel assembly;

h) the vacuum hose being attached to a hose clamp;

i) the hose clamp securing the vacuum hose to the funnel assembly;

j) the vacuum hose directing the flow of residue a suitable disposal location;

k) the vacuum hose collecting sparks, dust, or grindings from the funnel assembly;

l) a channel edge being removably secured to an outer side of the funnel assembly;

m) a slidably mounted torpedo being centrally mounted in the narrow base; and n) the torpedo permitting the flow of residue to the vacuum hose to be adjusted.

18. The dust collector of claim 17 further comprising:

a) the funnel assembly including a cone and a funnel housing to support the torpedo;

b) the cone being mounted within the funnel housing; and c) the cone being spaced apart from the funnel housing to permit the flow of residue.

19. The dust collector of claim 18 further comprising:

a) the torpedo having a conical tip protruding through the cone;

b) the conical tip having a truncated cone protruding from a base of the conical tip; and c) a torpedo pilot in the form of a cylindrical base extending from the truncated cone and being oppositely disposed from the conical tip.

20. The dust collector of claim 19 further comprising:

a) the funnel assembly having a base sleeve;

b) the base sleeve having a generally cylindrical shape;

c) the base sleeve having a hose end attached to the vacuum hose;

d) the base sleeve having a funnel end oppositely disposed the hose end attached to the narrow base;

e) the funnel assembly having a smaller diameter than hose end in order to slide into the narrow base;

f) the hose end including a mount coupling finger to permit snap attachment of the base sleeve to the narrow base;

g) the funnel assembly having a housing collar at the wide mouth;

h) the housing collar including a lower u-shaped end cap and upper crescent end cap;

i) the housing collar being snap fitted to the wide mouth;

j) the housing collar including a pair of oppositely disposed side channel end caps;

k) the housing collar serving to trap the flow of residue;

l) the funnel housing including dust apertures at the wide mouth;

m) the hose end including a vertical strut support for the torpedo;

n) the vertical strut support including a central ring therein to receive the torpedo pilot and thereby mount the torpedo in the funnel assembly.

\* \* \* \* \*